UNITED STATES PATENT OFFICE.

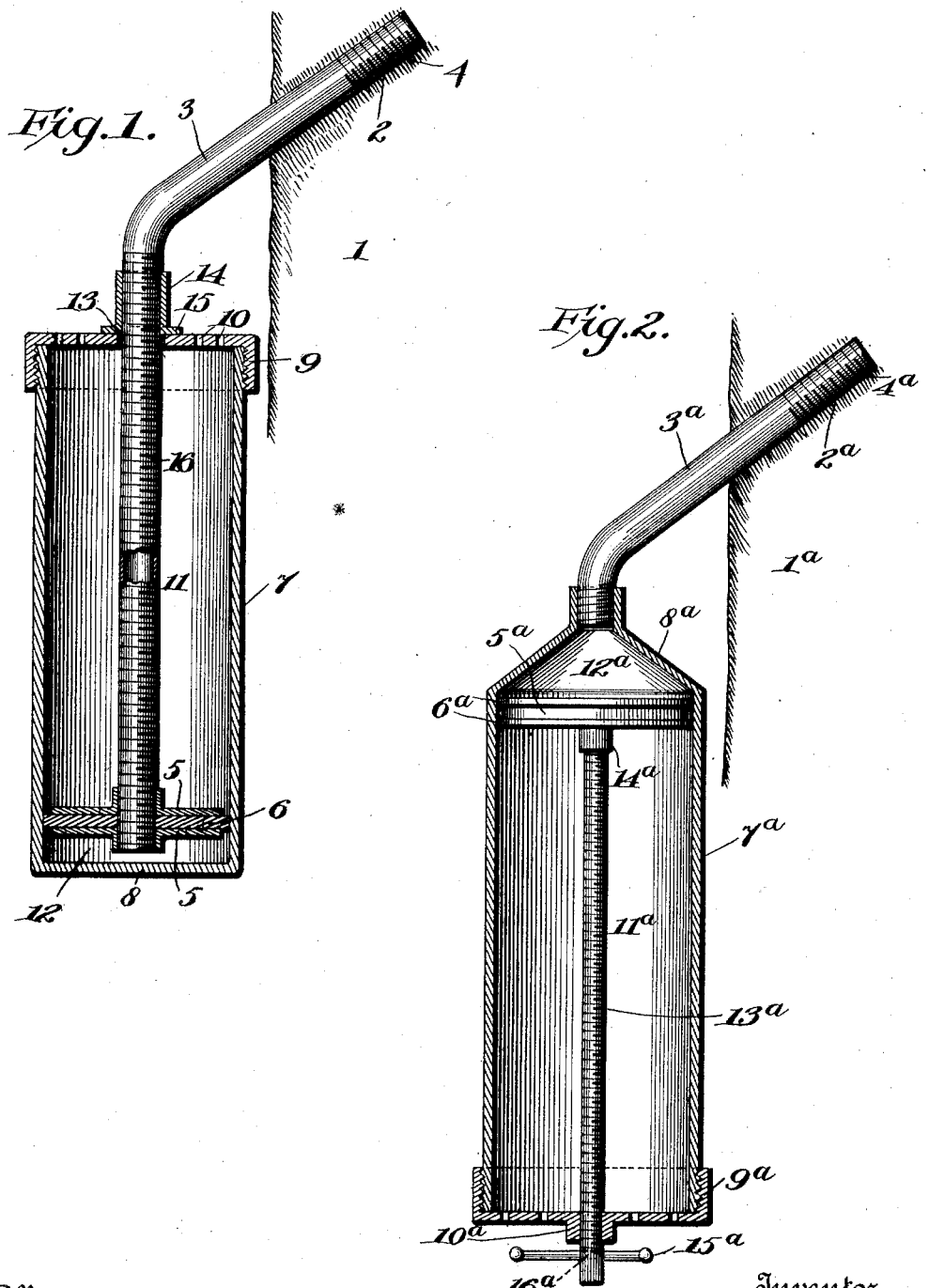

HERMAN H. BOYER, OF PENSACOLA, FLORIDA.

TURPENTINE-CUP.

1,009,641.　　　　　Specification of Letters Patent.　　Patented Nov. 21, 1911.

Application filed March 4, 1911. Serial No. 612,311.

*To all whom it may concern:*

Be it known that I, HERMAN H. BOYER, a citizen of the United States, residing at Pensacola, in the county of Escambia and State of Florida, have invented certain new and useful Improvements in Turpentine-Cups; and I do hereby declare the following to be a full, clear, and exact description of the invention, such as will enable others skilled in the art to which it appertains to make and use the same.

This invention relates to improvements in devices for collecting sap from trees, and is particularly designed as a cup for gathering turpentine.

The chipping and cupping of a tree, heretofore practiced, tends to stop its growth, weaken the tree, and kill the timber, leaving the tree open to the ravages of fire and the other elements. By the present system the tree is not weakened to any susceptible degree, and the hole that is bored will heal up in two or three years' time, leaving scarcely a scar, so that the tree can be worked for turpentine purposes indefinitely. Also, in many instances, considerable loss is entailed owing to a portion of the turpentine flowing from the cut, down trunk of the tree, without being conveyed into the cup.

The primary object of the present invention is to overcome these objections and to more effectively extract the turpentine, with substantially no loss of the fluid.

With this primary object in view the invention broadly consists in providing a cup having a conduit leading to the interior thereof, the other end being snugly fitted in a bore made in the tree, a piston being located within said cup, the piston and cup being operative relatively to each other to tend to create a vacuum in the cup on that side of the piston opposite to the entry of the conduit into the cup.

It will be understood that the invention is not restricted to the exact details shown and described, but for the purpose of disclosure reference is had to the accompanying drawings illustrating practical embodiments of the same, in which drawings like characters designate the same parts in the several views, and in which—

Figure 1 is a view showing my invention applied to a tree, the cup and piston and operating nut being shown in longitudinal section. Fig. 2 is a view substantially similar to Fig. 1, showing a modified form in which the piston is movable and the cup stationary.

Referring to Fig. 1, 1 designates a tree suitably bored, as at 2, preferably at an angle of substantially 45° and of a depth corresponding to a depth which will be most satisfactorily permitted by the size of the tree.

3 designates a conduit consisting of a pipe which may be threaded at its end 4 for the more effectively securing the pipe within the bore, the lower end of the pipe being bent preferably at an angle of 45° to depend substantially parallel with the tree or vertically of the ground. At the lower end of the pipe is secured a piston head of any suitable construction, but provided with a peripheral edge that will frictionally engage the interior wall of the cup, to be referred to, in such manner as to effectively prevent leakage therearound. In Fig. 1 this piston head is shown as consisting of the metallic or other stiff disks 5, between which is interposed a washer or gasket 6 of rubber, leather, or similar flexible material, the peripheral edge of which snugly engages the inner wall of the cup 7 formed of any suitable material, the bottom of the cup being closed, as at 8, and the cup being suspended by the friction between the piston head and the inner wall of the cup.

As shown in Fig. 1 the upper end of the cup is threaded and is fitted with a metal cap 9, perforated, as at 10, to admit air into the chamber 11 on one side of the piston head, the other side of the piston head forming with the cup a chamber 12 communicating with the pipe 3. The cap 9 of the cup may be guided on the lower end of the pipe in any suitable way, the drawings showing a sufficiently large aperture to freely receive the pipe.

In practice, with a cup two inches across, the pressure would not be so great as to preclude moving the piston and cup, relatively to each other, by hand, but, of course, a complete vacuum is not created. However, any suitable means may be employed for forcing the cup downwardly with respect to the piston head, which will tend to create a vacuum in the chamber 12, and in order to make this chamber 12 the more air tight a small quantity of water or other sealing liquid may be poured in the chamber 11, which will lie above the piston head and act somewhat like a hermetic seal.

In Fig. 1 of the drawings the means for forcing the cup 7 downwardly is shown as comprising a threaded sleeve 14 provided with a base flange 15 engaging the cover of the cup and coöperating with the vertical portion of the pipe threaded as at 16. In Fig. 2 the arrangement is substantially reverse, that is the cup is held stationary while the piston is operated, and this may be done in several ways. In the drawings 1ª designates the tree, 2ª the bore, 3ª the conduit pipe, which may be threaded as at 4ª, and this conduit pipe instead of being formed integral with the cup may be connected to it as shown by a screw-threaded joint.

In this construction a slightly modified packing for the piston head is shown, 5ª designating a metallic disk having the leather or rubber friction disk 6ª on both sides of same to engage the interior wall of the cup 7ª. The top of the cup in this view is shown as tapering, as at 8ª, and provided with a threaded nipple to receive the end of the pipe 3ª.

The lower end of the cup is provided with a removable threaded cap 9ª provided with air openings and having a threaded boss 10ª to receive a threaded rod 13ª, the upper end of which may be connected with the piston head in any suitable way to swivel thereon, shown conventionally at 14ª, and the lower end of the rod being provided with an operating handle 15ª which may pass laterally through a bore 16ª, for convenience in turning the rod. In this construction the air is admitted to the chamber 11ª on the lower side of the piston, the vacuum being created in the chamber 12ª on the upper side of the piston.

In operation, and referring to Fig. 1, it will be observed that upon turning the nut 14 (which may be done rapidly in a ratchet-like fashion by applying a pipe wrench thereto) the cup will have great leverage exerted on it to force the same downwardly, creating a vacuum in the chamber 12 for sucking the sap or turpentine through the pipe 3.

In Fig. 2 the cup remains stationary while the threaded rod 13ª is turned by the handle 15ª, drawing the piston head downwardly and forming a vacuum in the chamber 12ª, the liquid, sap, or turpentine above the piston tending to seal any leakage therearound after a hermetic fashion.

Having thus described practical and preferred embodiments of the invention, the particular features of novelty will now be pointed out more succinctly in the following claims:—

1. The combination of a cup, a piston head snugly fitting therein and forming an air tight chamber on one side thereof, the chamber on the opposite side of said piston being open to the atmosphere, and a pipe suspending said cup and communicating with said air tight chamber at one end and at its other end bent at an angle and adapted to be inserted and securely fitted within an angular bore formed in a tree, and said cup and piston being movable relatively to each other for creating a vacuum in said air tight chamber and causing a substantially continuous suction in said inserted pipe, substantially as described.

2. The combination of a cup, a snugly fitting piston therein adapted to form an air tight chamber at one end of said cup, the other end of said cup being open-ended, a pipe leading into said air tight chamber and at its other end adapted to be inserted and securely fixed within a bore formed in a tree, and a cap provided with perforations for closing the open end of said cup, and said cup and piston being movable relatively to each other for creating a vacuum in said air tight chamber and causing a substantially continuous suction in said inserted pipe, substantially as described.

In testimony whereof, I affix my signature, in presence of two witnesses.

HERMAN H. BOYER.

Witnesses:
F. A. BOGHICH, Jr.,
G. RALFS.

Copies of this patent may be obtained for five cents each, by addressing the "Commissioner of Patents, Washington, D. C."